United States Patent [19]

Iwahashi

[11] Patent Number: 5,075,810
[45] Date of Patent: Dec. 24, 1991

[54] TAPE CASSETTE WITH SEALED LIGHT APERTURE

[75] Inventor: Yuji Iwahashi, Miyagi, Japan

[73] Assignee: Sony Corporation, Tokyo, Japan

[21] Appl. No.: 636,564

[22] Filed: Jan. 7, 1991

Related U.S. Application Data

[63] Continuation of Ser. No. 279,533, Dec. 5, 1988, abandoned.

[30] Foreign Application Priority Data

Dec. 29, 1987 [JP] Japan .................................. 62-199242

[51] Int. Cl.⁵ ............................................. G11B 23/02
[52] U.S. Cl. .................................. 360/132; 360/74.6; 242/199
[58] Field of Search ................ 360/132, 74.6; 242/197, 242/198, 199

[56] References Cited

U.S. PATENT DOCUMENTS

| 3,615,155 | 10/1971 | Gelbman . | |
|---|---|---|---|
| 4,602,303 | 7/1986 | Pertzoch et al. | 360/74.6 |
| 4,672,498 | 6/1987 | Harada | 360/132 |
| 4,706,149 | 11/1987 | Machida et al. | 360/132 |
| 4,740,857 | 4/1988 | Ogawa | 360/132 |

FOREIGN PATENT DOCUMENTS

| 0090573A1 | 10/1983 | European Pat. Off. . | |
|---|---|---|---|
| 0163887A1 | 12/1985 | European Pat. Off. . | |
| 3408694A1 | 9/1985 | Fed. Rep. of Germany . | |
| 2286468 | 4/1976 | France . | |
| 0192095 | 8/1986 | Japan | 360/74.6 |
| 2150916A | 7/1985 | United Kingdom . | |

Primary Examiner—Andrew L. Sniezek
Attorney, Agent, or Firm—Philip M. Shaw, Jr.

[57] ABSTRACT

A tape cassette suitable for use in an 8-mm video tape recorder for recording and/or reproducing video and audio signals, which comprises a light projecting section inserting aperture formed on the bottom surface of the cassette near the front surface of the cassette between supply and takeup reels juxtaposed in the cassette, light receiving windows formed through the both side walls of the cassette for passing therethrough a light emitted from a light emitting element inserted in the light projecting section inserting aperture and a transparent portion molded integrally with the upper surface of the cassette such that the supply and takeup reels are visible through the transparent portion, wherein a transparent portion formed at least a part of a wall portion surrounding the light projecting section inserting aperture is integrally molded with the transparent portion of the upper surface of the cassette, to thereby easily manufacture the tape cassette which can prevent infiltration of dust or the like and accordingly protect the magnetic tape from appearing thereon rust or the like.

2 Claims, 2 Drawing Sheets

TAPE CASSETTE WITH SEALED LIGHT APERTURE

This is a continuation of co-pending application Ser. No. 07/279,533 filed on Dec. 5, 1988 now abandoned.

BACKGROUND OF THE INVENTION

1. Field of the Invention

This invention relates to a tape cassette suitable for use in an 8 mm-video tape recorder or the like for recording and/or reproducing audio and video signals.

2. Description of the Prior Art

For a conventional magnetic tape end detection used in a reel-to-reel type tape cassette, the ends of respective transparent leader and trailer tapes are secured to a supply reel and a takeup reel accomodated in parallel in the cassette. A magnetic tape is interposed between the leader and trailer tapes and wound on either the supply reel or the takeup reel. Then, a light is reflected on or transmitted through the leader or trailer tape and reflected or transmitted light is detected, whereby the beginning or the end of the tape is detected.

A tape cassette for use in recording and/or reproducing a video signal employing such transmissive light is disclosed in Official Gazette of Japanese Utility Model Registration Publication No. 55-40618. The tape cassette shown in this document has an opening through the bottom part at a position near the front surface of the cassette between the supply and takeup reels accomodated in parallel in the cassette for receiving a light projecting section and light receiving windows formed through both side walls of the cassette for transmitting therethrough the light from a light projecting element of the light projecting section inserted in the opening. When the leader tape or the trailer tape is facing the light receiving windows, the light from the light emitting element is incident on a light receiving surface of a light receiving element disposed in the vicinity of the light receiving window, whereas the light from the light emitting element is interrupted by the magnetic tape when the magnetic tape is present at the light receiving window, thereby allowing for detection of the beginning or the end of the magnetic tape.

In the above-mentioned tape cassette construction, if the cassette accomodating a metal tape, particularly a vapor deposition tape or the like which does not use a binder as a metal thin film, is left unused for a long time, dust and gas in the atmospheric air which may cause damage to the tape surface can readily enter into the cassette through the light receiving windows formed through the side walls and the light projecting section inserting opening, whereby dust not only gets on the magnetic tape surface but also rust may appear on the tape, particularly the vapor deposition tape.

Naturally, the above-mentioned conventional tape cassette is provided with a lid for closing the front opening portion of the cassette to protect the exposed tape and prevent dust from getting on the tape for preserving the cassete when it is not used for a long time. This lid is designed to also close the light receiving windows formed through the side walls. However, such construction cannot completely prevent rust from appearing on the tape.

OBJECTS AND SUMMARY OF THE INVENTION

The present invention has been made in view of the above-mentioned defects and its object is to provide a tape cassette which is capable of improving sealing of the tape cassette to thereby prevent dust, gas and so on in the atmospheric air from entering the cassette and accordingly prevent rust from appearing on the surface of the tape as well as prevent any drop-out on the magnetic tape and clogging of the magnetic head.

To achieve the above object, the present invention provides a tape cassette for use in a recording and/or reproducing apparatus having a light projecting section incorporated therein, comprising:

a housing;

supply and takeup reels mounted in juxtaposition in said housing;

said aperture for inserting said light projecting section formed on the bottom surface of said housing near the front surface of said housing between supply and takeup reels;

light receiving windows formed through both side walls of said housing for passing therethrough a light emitted from said light projecting section inserted in said aperture;

a first transparent portion molded integrally with the upper surface of the cassette such that said supply and takeup reels are visible through said transparent portion; and a second transparent portion which forms at least a part of a wall portion surrounding and sealing said aperture and which is integrally molded with said transparent portion.

The above and other objects, features and advantages of the present invention will become apparent from the following detailed description of the preferred embodiment taken in conjunction with the accompanying drawings, throughout which like reference numerals designate like elements and parts.

DETAILED DESCRIPTION OF THE PREFERRED EMBODIMENT

One embodiment of a tape cassette according to the present invention will hereinafter be described with reference to the accompanying drawings.

Figure 1:
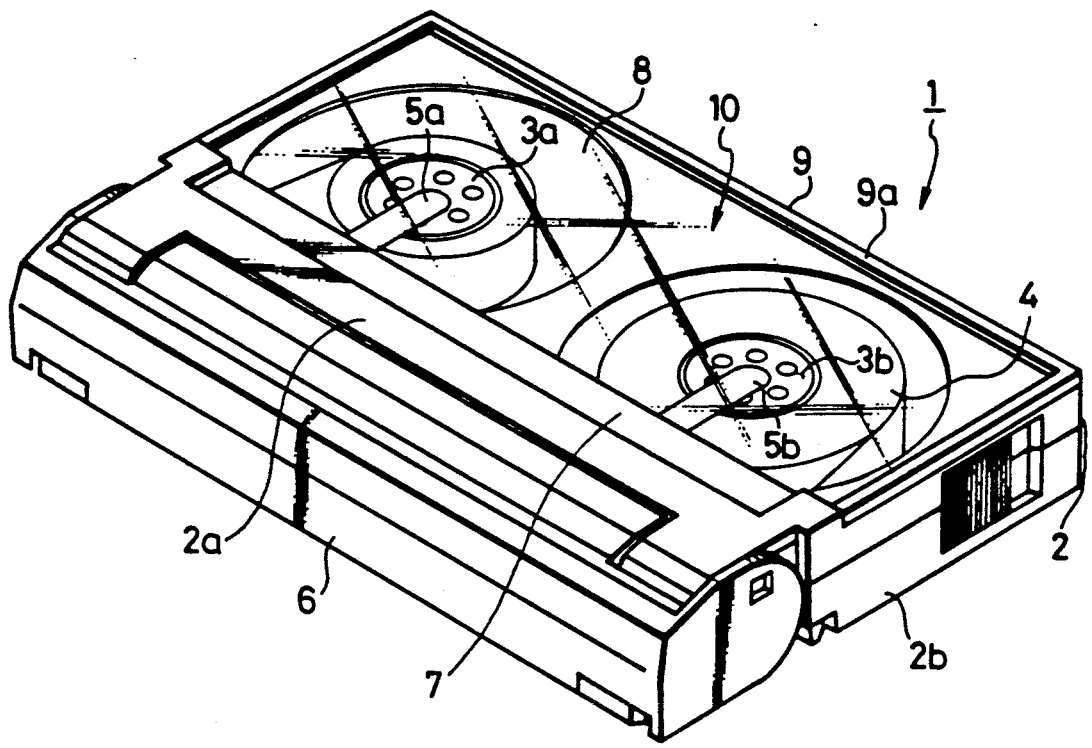
FIG. 1 is a perspective view showing the appearance of an embodiment of a tape cassette according to the present invention.

In FIG. 1, a tape cassette, specifically a tape cassette for use in the so-called 8-mm video tape recorder in the present embodiment, is generally indicated at 1. A cassette housing 2 is formed of upper and lower halves 2a and 2b made of opaque resin material, for example, ABS resin which are secured together. A pair of reel hubs 3a and 3b are accomodated in the upper and lower halves 2a and 2b of the cassette housing 2, on which a magnetic tape 4 is wound. Reel urging springs 5a and 5b urge the reel hubs 3a and 3b, respectively, so as to prevent the reel hubs 3a and 3b from being vibrated. The magnetic tape 4 wound about the reel hubs 3a and 3b is exposed through a tape guide at the front surface portion of the cassette housing 2. The tape exposing portion at the front surface is normally closed by a front surface lid 6 which is rotatably pivotted on the front surface of the cassette housing 2. When the cassette is in use, the front surface lid 6 is rotated in the opening direction to expose the magnetic tape 4 at the front surface portion of the cassette housing 2.

A label area 7 is formed on an approximately central portion of the upper surface of the upper half 2a which is slightly recessed from the reference surface on the upper surface of the upper half 2a for adhering thereon a label on which recorded contents of the tape are written.

Adjacent to the label area 7, there are formed window portions 8 in a rear portion of the upper surface of the upper half 2a such that substantially all of the magnetic tape 4 wound around the reel hubs 3a and 3b is visible therethrough.

There are arranged in the cassette housing 2 members used for detecting the tape ends, bases for mounting the reel urging springs 5a and 5b, reel brake members and so on, as will be later referred to, which, however, are all covered with the main body portion of the upper half 2a made of opaque material, so that they are not visible from the outside.

The window portions 8 are formed in the tape cassette constructed as described above in the following manner. Transparent material 9 such as acrylic resin or the like is laminated on the main body portion of the upper half 2a by a lamination two-color molding technique using, for example, a rotary core to form a two-layer laminated portion 10 which is located at the rear side portion of the upper surface of the upper half 2a.

This laminated portion 10 has a portion thereof formed of only the transparent material 9 which constitutes the window portions 8.

The window portions 8 are each formed in a circular shape having substantially the same diameter as a maximal diameter of the magnetic tape 4 wound around the reel hubs 3a and 3b.

Figure 3:
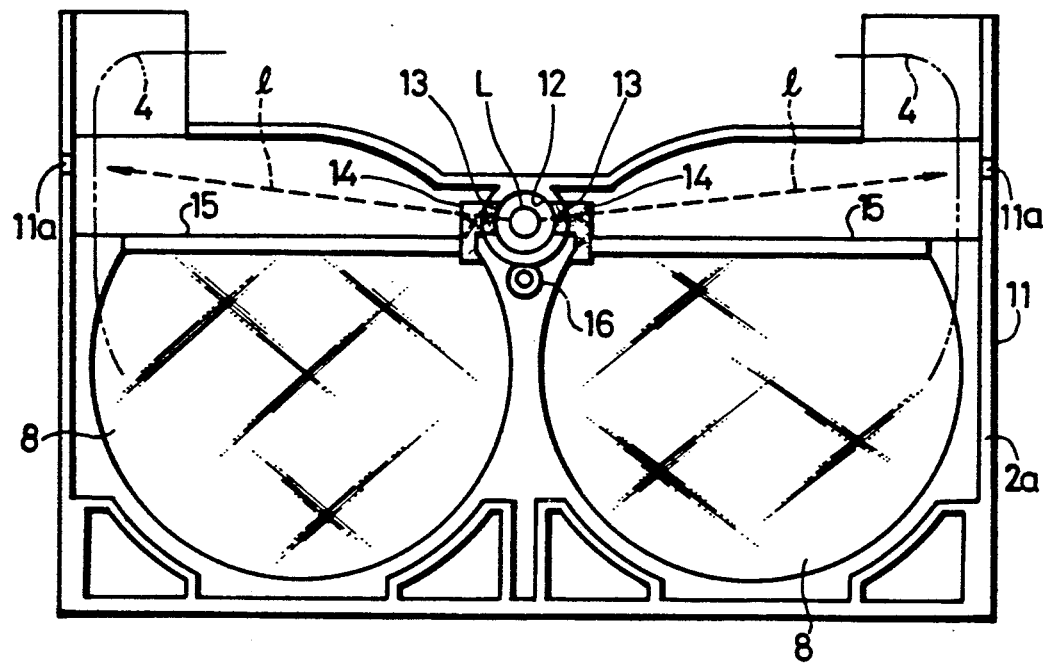
FIG. 3 is a perspective view of the upper half of the tape cassette of FIG. 1.

The magnetic tape 4 loaded in the tape cassette 1 has one and transparent other ends thereof made as the leader and trailer tapes, respectively. For detecting these leader and trailer tapes, the cassette housing 2 is provided with a light projecting section inserting aperture and light receiving windows. Specifically, as shown in FIG. 2, the light projecting section inserting aperture 23 is located at the center near the front surface of the cassette on the bottom of the lower half 2b, and the light receiving windows 11a are formed respectively through left and right end portions of a side wall 11 surrounding the outer periphery of the upper half 2a as shown in FIG. 3.

Figure 2:
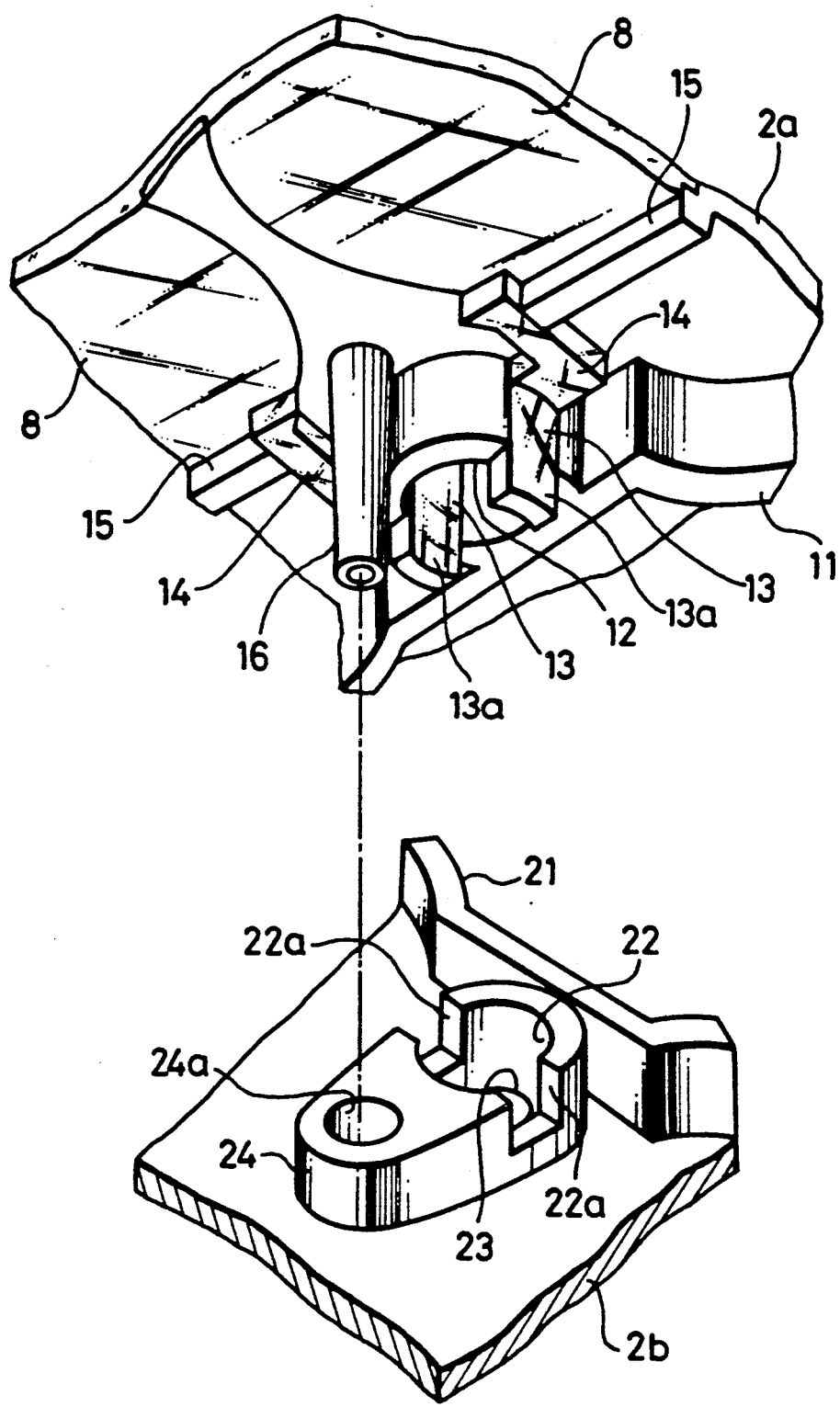
FIG. 2 is an exploded perspective view of a main portion of the tape cassette of FIG. 1.

In the present embodiment, substantially annular wall portions 12 and 22 are integrally formed on the upper and lower halves 2a and 2b at positions surrounding the light projecting section inserting aperture 23, as shown in FIG. 2. The annular wall portion 12 on the upper half 2a has two transparent portions 13 made of the transparent material 9 at two positions, i.e. toward the left side face and the right side face of the cassette, whereas the rest of the annular wall portion 12 is made of opaque resin material. The respective transparent portions 13 are integrated, through coupling protrusions 14, with the window portions 8 made of the transparent material 9 formed on the upper surface of the upper half 2a. Thus, the transparent portions 13 are integrated with the window portions 8 when the latter are molded. In the present embodiment, the lower end portions 13a of the transparent portions 13 near the lower half 2b protrude downwardly more than the opaque portion of the wall portion 12. The upper half 2a is provided with a guiding rod 16 protruded adjacent to the wall portion 12 of the upper half 2a for aligning the upper and lower halves 2a and 2b when they are secured with each other. Further, reinforcing ribs 15 are formed on the inner surface of the upper half 2a at the boundary between the window portion 8 and the opaque portion near the front surface portion.

The wall portion 22 provided around the light projecting section inserting aperture 23 on the lower half 2b is molded adjacent a side wall 21 surrounding the outer periphery of the lower half 2b. A cut-away concave portion 22a is provided in the wall portion 22 at two positions corresponding to the lower end portions 13a of the transparent portions 13 of the upper half 2a. A guide rod accomodating portion 24 is provided at the position corresponding to the guide rod 16 integrally with the wall portion 22. The guide rod accomodating portion 24 has a guide rod inserting hole 24a at the center thereof.

When the upper half 2a and the lower half 2b are coupled together, insertion of the guide rod 16 into the guide rod inserting hole 24a causes the side wall 11 of the upper half 2a and the side wall 21 of the lower half 2b come into contact with each other, whereby a spacing for accomodating the magnetic tape 4 is formed inside. In this event, the lower ends 13a of the transparent portions 13 of the wall portion 12 of the upper half 2a are engaged with the cut-away concave portions 22a of the wall portion 22 of the lower half 2b, and consequently the wall portions 12 and 22 of the upper and lower halves 2a and 2b are abutted and coupled together. Therefore, the inside spacing of the light projecting section inserting aperture 23 is separated by the wall portions 12 and 22 from the magnetic tape accomodating spacing in the cassette housing 2.

Next, explanation will be given to how the beginning end and the terminal end of the tape 4 are detected when the tape cassette 1 of the present embodiment is loaded in a video tape recorder. As illustrated in FIG. 3, a light emitting element L disposed in the video tape recorder is inserted into the light projecting section inserting aperture 23 on the bottom surface of the tape cassette 1, and light receiving elements (not shown) are positioned in the vicinity of light receiving windows 11a on the left side end and the right side end of the tape cassette 1, respectively. Thus, a light 1 from the light emitting element L is emitted through the transparent portions 13 of the wall portion 12 to the magnetic tape 4 accomodated in the cassette. When the transparent leader tape or the transparent trailer tape of the magnetic tape 4 is transported in front of the light receiving windows 11a, the light 1 passes through the transparent tape and reaches the light receiving window 11a, whereby the light receiving element disposed in the vicinity of the light receiving window 11a detects the light 1 passed through the tape and accordingly the beginning or terminal end of the tape can be detected.

The tape cassette of the present embodiment is provided with the transparent portions 13 in the wall portion 12 of the aperture 23 for inserting the light projecting section for detecting the beginning and terminal ends of the tape, and the inside of the inserting aperture 23 is separated from the tape accomodating space in the cassette housing 2, so that the inside of the cassette housing 2 can be tightly sealed. It is therefore possible to prevent infiltration of dust and so on into the cassette housing 2 and degradation of the magnetic tape by the appearance of rust thereon or the like and thus avoid occurrence of the aforementioned drop-out.

Further, since the transparent portion 13 of the wall portion 12 surrounding the light projecting section inserting aperture 23 is molded integrally with the window portion 8 of the upper surface of the upper half 2a integrated with the opaque portion by the lamination two-color molding, it is resin-molded simultaneously with the window portion 8. Such construction of the present embodiment can reduce the number of components and simplify the tape cassette, compared with a cassette in which the transparent portion 13 is assembled as a separate part. The transparent portion 13 is coupled with the window portion 8 through the coupling protrusions 14, so that resin can be implanted up to the transparent portion 13 from the gate 25 for molding the window portion 8 upon resin-molding. Therefore, only one gate 25 for implanting transparent resin is sufficient so that the molding machine for the tape cassette of the present embodiment can be simplified.

According to the tape cassette of the present invention as described above, since the inside of the light projecting section inserting aperture is sealed with the wall portion having the transparent portion, infiltration of dust or the like is prevented. Further, since the transparent portion is molded integrally with the transparent portion of the upper surface of the cassette, the tape cassette of the present invention can be easily manufactured.

The above description is given on a single preferred embodiment of the invention but it will be apparent that many modifications and variations could be effected by one skilled in the art without departing from the spirits or scope of the novel concepts of the invention so that the scope of the invention should be determined by the appended claims only.

I claim as may invention:

1. A tape cassette of a type having an upper cassette half and a lower cassette half which are opaque, and which are assembled to form front, rear, and side walls, the upper cassette half having an upper surface and the lower cassette half having a bottom surface; and a light emitting element insertion portion located therebetween, a tape-shaped medium having a light transmissive portion wound around a supply reel and a takeup reel between the upper and lower cassette halves and surrounding the light emitting element insertion portion, and a light receiving window through at least one side wall so as to oppose the light emitting element insertion portion across the tape-shaped medium, whereby when the tape cassette is loaded into a recording and reproducing apparatus, a light emitting element is inserted into the light emitting element insertion portion and a light receiving element is located outside of the light receiving window, to thereby establish a light path therebetween and allow detection of a predetermined portion of the tape-shaped medium, the tape cassette comprising:

a transparent window attached to the upper surface of the upper cassette half such that the supply and takeup reels are visible through the transparent window;

a pair of opaque upper, opposed, partially cylindrical portions integrally formed as one piece with the upper cassette half and a notched, lower cylinder portion which is integrally formed as one piece with the lower cassette half, the upper and lower cylindrical portions being shaped and dimensioned to mate with each other when the upper cassette half and the lower cassette half are joined together;

a transparent portion which is molded integrally with the transparent window as one piece and which is positioned between the upper opposed, partially cylindrical portions and which extends into the notch of the lower cylindrical portion such that together the transparent portion and the upper and lower cylindrical portions form a sealed cover over and around the light emitting element insertion portion when the upper cassette half and the lower cassette half are joined together, the transparent portion being aligned with the light receiving window to allow the light from the light emitting element to be transmitted through the transparent portion and the light receiving window to the light receiving element.

2. A tape cassette according to claim 1, wherein the transparent portion is integrally connected with the transparent window as one piece through one or more ribs which extend under the surface of the upper cassette half.

* * * * *